United States Patent [19]

Condon et al.

[11] Patent Number: 4,938,535

[45] Date of Patent: Jul. 3, 1990

[54] ADJUSTABLE SHOULDER/LAP SEAT BELT ADAPTER

[76] Inventors: Dolores Condon; Theresa A. Foster; John C. Foster, all of P.O. Box 50577, Reno, Nev. 89513

[21] Appl. No.: 366,074

[22] Filed: Jun. 14, 1989

[51] Int. Cl.$^5$ .............................................. B60R 22/00
[52] U.S. Cl. ..................................... 297/483; 24/306; 280/808; 297/468; 297/DIG. 6
[58] Field of Search ................ 297/468, 483, DIG. 6, 297/482; 24/306, 442; 280/801, 802, 804, 808

[56] References Cited

U.S. PATENT DOCUMENTS

| | | | |
|---|---|---|---|
| 481,425 | 8/1892 | Robinson | 24/300 |
| 3,307,872 | 3/1967 | Murcott | 297/468 |
| 3,860,261 | 1/1975 | Takada | . |
| 4,118,837 | 10/1978 | Hoch | 24/306 X |
| 4,588,224 | 5/1986 | Hill, Jr. | . |
| 4,648,625 | 3/1987 | Lynch | . |
| 4,800,594 | 1/1989 | Young | 24/442 X |
| 4,832,367 | 5/1989 | Lisenby | 297/483 X |

FOREIGN PATENT DOCUMENTS 3132735  3/1983  Fed. Rep. of Germany ...... 297/483

Primary Examiner—Peter R. Brown
Attorney, Agent, or Firm—Sughrue, Mion, Zinn, MacPeak & Seas

[57] ABSTRACT

An adjustable shoulder/lap seat belt adapter in the form of an elongated strap, has fixably mounted on one face thereof a central strip of one of a hook-and-loop type fastener material tape intermediate the ends of the elongated strap. Short length strips of the other of hook-and-loop type fastener tape are affixed to opposite ends of the elongated strap on the same face. Closed loops are formed at the end of the elongated strap about a shoulder strap and a lap strap of a shoulder/lap seat belt securing an occupant to an automotive motor vehicle seat, preventing ride up of the shoulder strap on the torso of the seat occupant, misuse of the shoulder strap, and eliminating the need for constant repetitive readjusting of the shoulder strap position. A swivel-mounted snap clamp affixed to the one face of the adapter elongated strap, clamps to the edge of the shoulder strap with a swivel axis oriented approximately 65° to the center line of the elongated strap.

2 Claims, 1 Drawing Sheet

ADJUSTABLE SHOULDER/LAP SEAT BELT ADAPTER

FIELD OF THE INVENTION

This invention relates to a shoulder/lap seat belt for automotive type motor vehicles and more particularly to an adjustable seat belt strap device for adjustably, detachably linking the shoulder strap and lap strap to prevent shoulder strap ride up and the necessity for periodic readjustment of the position of the shoulder strap while driving.

Conventionally, seat belt assemblies, particularly for the front seat of motor vehicles involve a combined, linked shoulder strap and lap strap on the door side of the seat which is coupled or linked through a common male fitting connector to a second lap strap mounted female connector or the female connector itself fixed to the seat, to the inside of the seat occupant. Typically, the shoulder strap extends from its junction with the lap strap, upwardly and across the chest of the occupant diagonally from the inside to the outside, over the shoulder and through a guide or pulley mounted to the side of the vehicle interior wall. The shoulder strap portion is wound to accumulate on a spring-biased retraction system reel within the door post or vehicle side wall adjacent to the seat.

U.S. Pats. No. 2,710,649 to Griswald et al, and No. 4,396,228 to Go, are exemplary of conventional shoulder and lap seat belts. In U.S. Pat. No. 4,396,228, a pair of shoulder straps extend downwardly to opposite sides of the user and are provided with ends which pass through fittings. Further, couplings connect the ends together to complete the connection between the pair of shoulder straps and to hold the seat occupant under effective body restraint. In Griswald, a single diagonal strap extends upwardly and over the back of the seat diagonally across the chest of the occupant. The diagonal strap fits through a fitting, and the terminal portion reverses across the lap to connect to a further lap strap from the opposite side, with connection centered above the lap of the occupant.

In an effort to form readily detachable connections between seat belt sections, loop-and-hook connection strips sold under the registered trademark VELCRO have been employed on the seat belt strap for detachably coupling one strap to another, or one section of a single strap to itself. U.S. Pats. No. 3,241,881, No. 4,205,670 and No. 3,499,681 are exemplary use of such VELCRO hook-and-loop fasteners in a double strapped safety harness with a connection to a cross strap at the lap being effected by a lap band including a hook-and-loop type fastener.

In this environment, U.S. Pat. No. 3,796,461 teaches a metal seat belt latch assembly, including an element which functions as a connector plate member, which is coupled to a piece of strapping material.

While such shoulder/lap seat belt perform adequately to restrain the user in the case of an accident, the user suffers some discomfort, limited interference with desired movement, and the shoulder strap and lap straps readily shift during automotive travel.

These U.S. Patents show various shoulder and lap type seat belts or other safety belt components useful in forming the same, such as latch assembly, and the employment of hook-and-loop type releasably engageable material strips for making connections between crossing portions of strapping material but the art as evidenced by these Patents fails to provide a mechanism for effectively maintaining the shoulder and lap straps in place and preventing the riding up of the shoulder strap thereof.

It is therefore a primary object of this invention to provide an improved, fully adjustable shoulder/lap seat belt adapter for maintaining correct placement and spacing between the shoulder strap and lap strap of existing shoulder/lap seat belt assemblies which readily adapts to the normal position of the crossing shoulder and lap strap or straps which readily adjusts to different torso sizes of the seat occupant, which is relatively simple, and which is inexpensive.

SUMMARY OF THE INVENTION

The invention is directed to an adjustable shoulder/lap seat belt adapter for a shoulder/lap seat belt assembly having a lap belt or strap extending across the lap of an occupant of a automotive motor vehicle seat from one side and integrally or otherwise connect to a shoulder strap extending downwardly and across the torso of the occupant from the same side of the seat and which latches the vehicle seat to the opposite side of the occupant via a realeasable coupling. The adjustable shoulder/lap seat belt adapter consists of an elongated strap having at opposite ends disconnectable loop-forming means for releasably enveloping said shoulder strap at the front of the occupant of the seat, and for releasably enveloping said one lap belt thereby forming a straight strap connection between said shoulder strap and said lap belt section to prevent ride up of the shoulder strap on the torso of the seat occupant and misuse of the shoulder strap while eliminating the need for constant, repetitive readjusting of the shoulder strap position, all without materially altering the restraint of the vehicle occupant by the seat belt assembly.

Preferably, the loop-forming means comprise an elongated strip of one hook-and-loop type fastener tape, fixably mounted on one face of said elongated strap over a longitudinally central portion of said strap. Short length strips of the other of said hook-and-loop type fastener tapes are fixed to opposite ends of the elongated strap on the same face thereat such that said loops are formed by face to face engaging said hook-and-loop fastener tapes in mutually confronting fashion.

A snap clamp may be mounted on said one face of said elongated strap at an intermediate position. The clamp has spring loaded, openable and closable jaws for releasably gripping an edge of said shoulder strap to maintain a desired releasable coupling therebetween at the crossover of said shoulder strap and said elongated strap of said adapter. The snap clamp may be swivel-mounted and oriented such that the longitudinal axis of the clamp is approximately 65° to the center line of the elongated strap. The snap clamp is fixed to the elongated strap, intermediate of said strip of one type hook-and-loop type fastener tape at the center portion of said elongated strap, and said strip other type said hook-and-loop type fastener tape fixed to the end of said elongated strap, proximate to said swivel-mounted snap clamp.

DESCRIPTION OF THE PREFERRED EMBODIMENT

Figure 1:
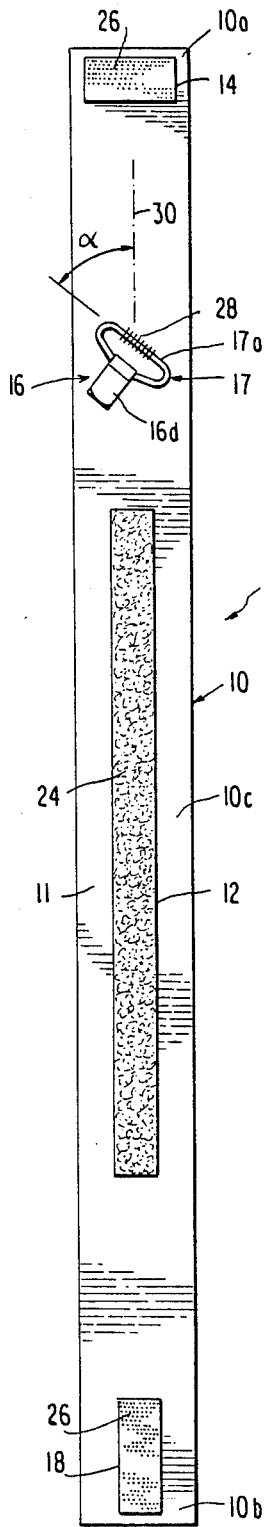
FIG. 1 is a plan view of the adjustable strapping device for a shoulder/lap seat belt assembly for a preferred embodiment of the present invention.

Referring to the drawings, FIG. 1 shows an adjustable shoulder/lap seat belt adapter indicated generally at 8 which comprises a unitary elongated, flexible material strap 10 having opposite ends 10a, 10b and an intermediate or central section 10c. On one "face" thereof, there is fixed by way of adhesive or the like an elongated fastener strip 12 of a loop form fastener material 12 having a large number of loops 24 facing outwardly of the fastener strip, and having a length somewhat in excess of one-half of the length of the elongated strap 10. At the ends 10a, 10b of the elongated strap 10, there are provided short fastener straps hook-type fastener strips material at 14, 18, respectively. These fastener material strips 14, 18 have hooks indicated at 26 projecting outwardly from the front face thereof. Similar to fastener strip 12, they are fastened on their rear face by adhesive to the face 11 of the elongated strap 10.

A snap clamp indicated generally at 16 is coupled to the face 11 of the elongated strap 10 by way of a swivel 17 of oval form, which is pivotably coupled to face 11 of the elongated strap 10 by sewing thread as at 28, such that the swivel 17 can rotate about a pivot axis defined by the threads 28. The snap clamp 16 is of conventional form, and includes snap opening jaws 16a, 16b. The snap clamp jaws are sized and of a length such as to frictionally grasp under a spring biasing force, a strap interposed between those jaws 16a, 16b. By pressing activator 16d the jaws 16a, 16b snap shut. Preferably, the swivel 17 is oriented so that a straight portion 17a under the threads extends at an angle $\alpha$ of approximately 65° with the center line 30 of the elongated strap 10. The elongated strap 10 may be approximately 65 cm in length and approximately 5 cm in width. It should be appreciated that the fastener strips 12, 14, 18 are of the mutually-engageable and releasable, hook-and-loop type sold under the trademark VELCRO. Fastener strip 12 may be approximately 30 cm in length, and 2.1 cm in width and is laterally centered on the face 11 of the elongated strap 10, positioned intermediate ends 10a, 10b of that strap. Fastener strip 14 maybe of a length of 3.7 cm, and a width of 2.1 cm, transversely oriented and centrally positioned side-to-side, and adjacent the edge of the strap at said end 10a. Fastener strip 18, on the other hand, has its longitudinal axis in line with the longitudinal axis of strap 10 carrying the same. Likewise, it may be 2.1 cm in width and have an overall length of 5.1 cm. Strips 14, 18 may be spaced 0.125 mc from the respective edges of the elongated strap 10, at the opposite ends 10a, 10b, respectively.

Figure 2:
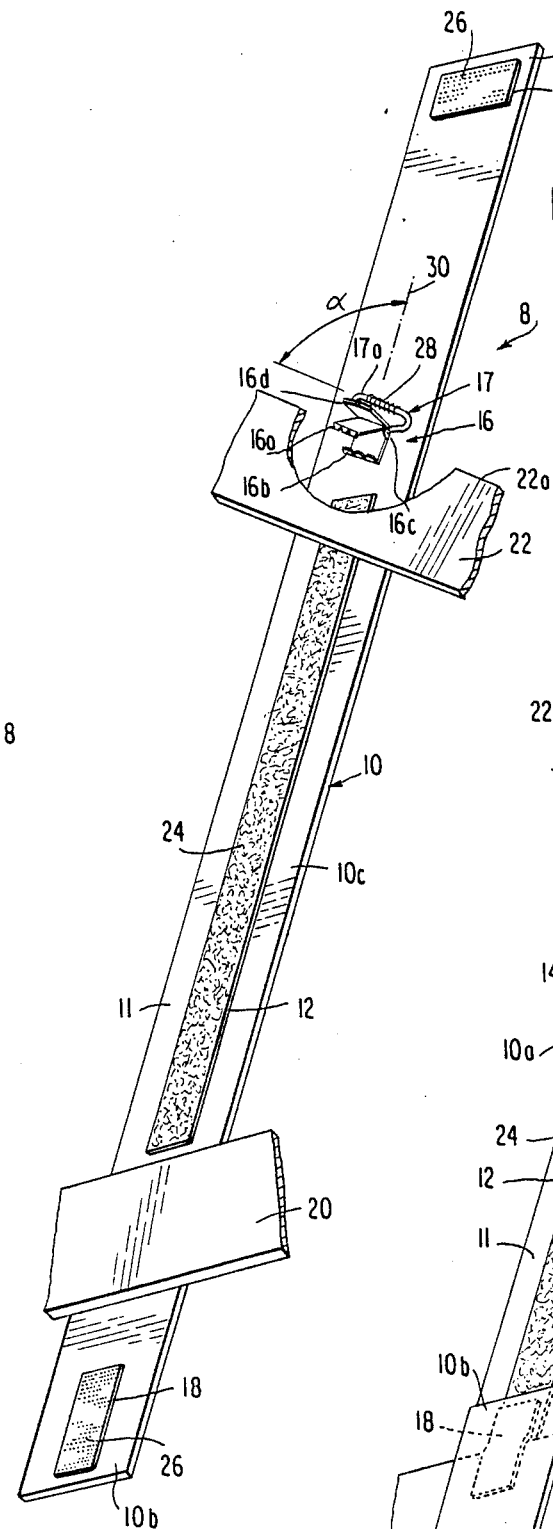
FIG. 2 is a perspective view of the adjustable strapping device of FIG. 1 positioned beneath shoulder strap and a lap strap portion of a shoulder/lap seat belt assembly to which the strapping device has application prior to forming loops within opposite ends of the strapping device securing the device to the shoulder strap and lap strap belt assembly.
Figure 3:
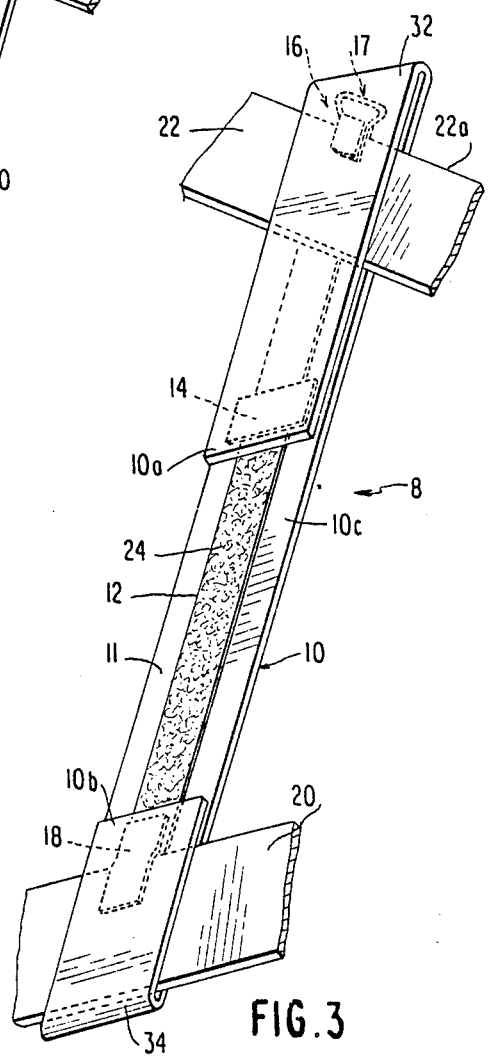
FIG. 3 is a perspective view similar to that of FIG. 2 after completion of the connections between the adjustable strapping device and the shoulder/lap seat belt assembly.

In use, the adjustable shoulder/lap seat belt adapter 8 is slid under both a lap strap 20 and a shoulder strap 22, FIGS. 2 and 3, with face 11 in contact with the rear surfaces of respective straps 20, 22. The elongated strap 11 is moved such that the upper edge 22a of shoulder strap 22 is inserted between the jaws 16a, 16b to the extent of the pivot connection between the jaws at head 16c of that member. It is noted that the edge 22a of the shoulder strap 22 is aligned with the 65° angular orientation of the base of the swivel 17 sewn to the face 11 of the strap by threads 28. Thus, the shoulder strap is maintained in its normally oblique orientation as it passes across the chest of the occupant (not shown) while adjuster elongated strap 10 is snap coupled thereto Under these circumstances, the fastener tape 12 extends between shoulder strap 22, and seat strap 20. With the shoulder strap 22 clamped by snap clamp 16, the respective ends 10a and 10b of elongated strap 10 are folded over so that face 11 at the ends 10a, 10b makes contact with the same "face", in the area of fastener tape 12. Thus, loops 32, 34 for the adjustable shoulder/lap seat belt adapter are readily formed at opposite ends. Loop 32 encompasses the portion of the shoulder strap 22 making connection with snap clamp 16. Both the loop 32 and the snap clamp 16 insure maintenance of the connection between the adapter 8 and the shoulder strap 22 at end 10a of the adapter elongated strap 10. The opposite end 10b is folded over the seat strap portion 20 and fastener tape 18 detachably attaches to the end of fastener tape 12 proximate to the seat strap 20. A closed loop 34 formed thereby securely holds the elongated strap 10 of the adapter to the seat strap 20, and at a set distance with respect to the captured portion of the shoulder strap 22 at the opposite end of the adapter elongated strap. Under these conditions, there is straight strap coupling completed between shoulder strap 22 and seat strap 20. This prevents the shoulder strap 22 of the adjustable shoulder/lap seat belt from riding up on the occupant s neck or under the arm of the occupant. This alleviates any "choking feeling" of the occupant or chaffing and irritation of the skin.

The presence of the adjustable shoulder/lap seat belt adapter 8 eliminates the need of the occupant to constantly readjust the current shoulder strap position on the occupant while driving. Further, the presence of the adjustable shoulder/lap seat belt adapter 8 prevents misuse (putting the shoulder strap under the arm or behind the torso) or non-use of current shoulder/lap seat belt. Further, the presence of the adjustable shoulder/lap seat belt adapter does not alter the restraint mechanism provided by the shoulder/lap seat belt system as defined by members 20, 22. Additionally, a single size adapter strap of approximately 65 cm in length fits all seat occupants whether children or adults. It allows compliance with the law of mandatory seat belt use predominantly required by the states.

Although the invention has been described with reference to particular embodiments thereof it should be realized that the various changes and modifications may be made therein without departing from the spirit and scope of the invention.

I claim:

1. An adjustable shoulder/lap seat belt adapter for a shoulder/seat belt assembly having a lap strap extending across the lap of an occupant of an automotive motor vehicle seat and connecting to a shoulder strap extending downwardly and across the torso of the occupant from the same side of the seat and latching to the vehicle seat, to the opposite side of the occupant, via releasable coupling of said adapter, comprising:

an elongated strap and disconnectable, loop-forming means for releasably enveloping said shoulder strap at the front of the occupant of the seat, and for releasably enveloping said lap strap, thereby forming a strap connection between the shoulder strap and the lap strap to prevent ride up of the shoulder strap on the torso of the seat occupant, misuse of the shoulder strap while eliminating the need for constant, repetitive readjusting of the shoulder strap position, without materially altering the restraint of the vehicle occupant by the seat belt assembly and wherein said loop-forming means comprises an elongated strip of one type hook-and-loop fastener tape fixedly mounted on one face of the elongated strap over a longitudinally central portion of said strap, and short length strips of the other of said hook-and-loop type fastener tape affixed to opposite ends of said elongated strap on said one face thereof whereby said loops are formed by face-to-face engagement between said short length strips of said other hook-and-loop type fastener tape and respective ends of said elongated strip of said one hook-and-loop type fastener tape, and said adapter further comprising a snap clamp mounted on said one face of said elongated strap at an intermediate position between one of said short length strips of the other of said hook-and-loop type fastening tape and the end of said elongated strip of one type hook-and-loop type fastener tape, and said clamp having spring loaded, openable and closable jaws for releasably gripping an edge of the shoulder strap passing through a loop thereof thereby maintaining a desired releasable coupling therebetween at the cross over of said shoulder strap and said elongated strap of said adjustable shoulder/lap seat belt adapter such that a loop of said seat belt adapter envelops said clamp and said gripped edge of said shoulder strap to prevent inadvertent opening of said clamp.

2. The adjustable shoulder/lap seat belt adapter as claimed in claim 1, wherein said clamp is swivel mounted to said one face of said elongated strap, by means defining a swivel axis approximately 65° to the center line of the elongated strap, and wherein the snap clamp is fixed to the elongated strap intermediate of said one hook-and-loop type tape strip centered on said elongated strap, and said strip of other type hook-and-loop type fastener tape, proximate to said swivel-mounted snap clamp.

* * * * *